United States Patent
Cho et al.

(10) Patent No.: US 9,822,831 B2
(45) Date of Patent: Nov. 21, 2017

(54) METHOD FOR LEARNING TOUCH POINT OF DUAL CLUTCH TRANSMISSION

(71) Applicant: HYUNDAI MOTOR COMPANY, Seoul (KR)

(72) Inventors: Sung Hyun Cho, Yongin-si (KR); Seung Sam Baek, Suwon-si (KR); Ho Young Lee, Bucheon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 34 days.

(21) Appl. No.: 15/069,386

(22) Filed: Mar. 14, 2016

(65) Prior Publication Data
US 2017/0138421 A1 May 18, 2017

(30) Foreign Application Priority Data
Nov. 18, 2015 (KR) .................. 10-2015-0161825

(51) Int. Cl.
*F16D 25/00* (2006.01)
*F16H 61/00* (2006.01)
(Continued)

(52) U.S. Cl.
CPC ............. *F16D 48/08* (2013.01); *F16D 23/02* (2013.01); *F16H 61/688* (2013.01); *F16H 63/46* (2013.01); *F16D 2500/102* (2013.01); *F16D 2500/10412* (2013.01); *F16D 2500/30415* (2013.01); *F16D 2500/50245* (2013.01)

(58) Field of Classification Search
CPC ..................... F16D 2500/50245; F16H 61/688
See application file for complete search history.

(56) References Cited

U.S. PATENT DOCUMENTS 5,871,419 A * 2/1999 Amendt ............... F16D 48/066
477/180
2008/0305931 A1 12/2008 Eich et al.
(Continued)

FOREIGN PATENT DOCUMENTS

JP 2013-053732 A 3/2013
KR 10-2014-0060013 A 5/2014
(Continued)

OTHER PUBLICATIONS

Notice of Allowance dated Dec. 21, 2016, issued in Korean patent application No. 10-2015-0161825.

*Primary Examiner* — Tisha Lewis
(74) *Attorney, Agent, or Firm* — McDermott Will & Emery LLP

(57) ABSTRACT

A method for learning a touch point of a clutch in a Dual Clutch Transmission (DCT) vehicle includes a synchronization determination step, a drive shaft slip inducement step in which the controller induces a clutch of the drive shaft to slip, a non-drive shaft torque application step in which the controller applies torque to a clutch of the non-drive shaft, and a touch point learning step in which, while the speed of the non-drive input shaft follows the engine speed in the non-drive shaft torque application step, the controller searches for a certain point at which the speed of the non-drive input shaft changes and differs from the speed of the drive input shaft, and learns the point as the touch point of the clutch of the non-drive shaft.

5 Claims, 3 Drawing Sheets

(51) Int. Cl.
    *F16D 48/08*     (2006.01)
    *F16D 23/02*     (2006.01)
    *F16H 61/688*     (2006.01)
    *F16H 63/46*     (2006.01)

(56) References Cited

U.S. PATENT DOCUMENTS

| | | | |
|---|---|---|---|
| 2014/0136065 A1* | 5/2014 | Yoon | F16D 48/06 |
| | | | 701/68 |
| 2014/0136066 A1* | 5/2014 | Cho | F16D 48/06 |
| | | | 701/68 |

FOREIGN PATENT DOCUMENTS

| | | |
|---|---|---|
| KR | 10-2014-0104562 A | 8/2014 |
| KR | 10-2015-0011482 A | 2/2015 |
| WO | 2013/124122 A1 | 8/2013 |

* cited by examiner

METHOD FOR LEARNING TOUCH POINT OF DUAL CLUTCH TRANSMISSION

CROSS REFERENCE TO RELATED APPLICATION

The present application claims the benefit of priority to Korean Patent Application No. 10-2015-0161825, filed Nov. 18, 2015 with the Korean Intellectual Property Office, the entire contents of which is incorporated herein for all purposes by this reference.

TECHNICAL FIELD

The present disclosure generally relates to a method for learning a touch point of a clutch. More particularly, the present disclosure relates to a method for learning a touch point of a clutch in a Dual Clutch Transmission (DCT) vehicle, in which a touch point is learned in a driving section in which the speed of a drive input shaft is synchronized with the speed of a non-drive input shaft while a vehicle is driven.

BACKGROUND

An automated manual transmission is a system for automatically controlling a transmission that is based on a manual transmission mechanism. Unlike an automatic transmission that uses a torque converter and a wet-type multi-disc clutch, the automated manual transmission transmits engine torque using a dry clutch.

Particularly, a dry clutch has characteristics that the clutch transmission torque varies depending on various factors such as the error tolerances of components, abrasion due to wear, thermal deformation caused by high temperatures, variations in coefficients of friction of discs, and the like. Accordingly, it is difficult to estimate torque transmitted during the driving of a vehicle.

Also, when the variation in transmission torque is not detected while the clutch is controlled, because excessive slip of the clutch or shock may occur in the clutch, an algorithm for estimating in real time torque characteristics of a dry clutch may be necessary.

A conventional method estimates the clutch transmission torque and a touch point through a Torque-Stroke (T-S) curve of the dry clutch. Here, the T-S curve is a curve illustrating a transmission torque characteristic of the dry clutch depending on the stroke of a clutch actuator, and the touch point represents the position (stroke) of the clutch actuator when torque starts to be transmitted to the clutch on the T-S curve.

Meanwhile, according to a conventional art, a touch point is learned under the condition in which a gear is not engaged with the non-drive shaft.

In other words, when the gear of the non-drive shaft is converted to neutral, the speed of the non-drive input shaft decreases during freewheeling. At this time, if clutch torque is applied slowly, a point at which the acceleration of the shaft changes may be acquired. Because this point means that the clutch starts to transmit torque, the point at which the acceleration starts to change may be regarded as the touch point.

However, occasionally, there may be a situation in which the speed of the non-drive input shaft does not decrease during freewheeling but is maintained to be almost the same as the speed of the drive input shaft while a vehicle is driven.

In this situation, the drive input shaft and the non-drive input shaft rotate as if they are synchronized.

Therefore, the conventional method for learning a touch point cannot be used, and another method for learning a touch point is required.

The foregoing is intended merely to aid in the understanding of the background of the present disclosure, and is not intended to mean that the present disclosure falls within the purview of the related art that is already known to those skilled in the art.

SUMMARY OF THE DISCLOSURE

Accordingly, the present disclosure has been made keeping in mind the above problem occurring in the related art, and the present disclosure is intended to propose a method for learning a touch point of a clutch in a DCT vehicle, which is capable of learning a touch point in a driving section in which a touch point cannot be learned by an existing method using a non-drive shaft because the speed of the non-drive input shaft is synchronized with the speed of a drive input shaft while the vehicle is driven.

In order to achieve the above object, according to one aspect of the present disclosure, there is provided a method for learning a touch point of a clutch in a DCT vehicle, which includes: a synchronization determination step in which a controller determines whether a difference between speed of a drive input shaft and speed of a non-drive input shaft is less than a reference value when a gear is engaged with the drive input shaft; a drive shaft slip inducement step in which the controller induces a clutch of the drive shaft to slip by partially releasing torque of the clutch of the drive shaft when it is determined in the synchronization determination step that the difference between the speed of the drive input shaft and the speed of the non-drive input shaft is less than the reference value; a non-drive shaft torque application step in which the controller applies torque to a clutch of the non-drive shaft so as to make the speed of the non-drive input shaft follow engine speed; and a touch point learning step in which, while the speed of the non-drive input shaft follows the engine speed in the non-drive shaft torque application step, the controller searches for a certain point at which the speed of the non-drive input shaft changes and differs from the speed of the drive input shaft, and learns the point as the touch point of the clutch of the non-drive shaft.

In the touch point learning step, a slip rate may be calculated as a ratio of the difference between the speed of the non-drive input shaft and the speed of the drive input shaft to the difference between the engine speed and the speed of the drive input shaft; and the touch point of the clutch of the non-drive shaft may be learned when the slip rate exceeds a predetermined value.

In the touch point learning step, when the slip rate exceeds the predetermined value, a stroke position of a clutch actuator of the non-drive shaft may be checked and learned as the touch point of the clutch of the non-drive shaft.

After the touch point learning step, the learned touch point of the clutch of the non-drive shaft may be used to update a characteristic curve of the clutch of the non-drive shaft.

The speed of the drive input shaft and the speed of the non-drive input shaft may be measured by input shaft speed sensors arranged on the drive input shaft and the non-drive input shaft, respectively; clutch torque applied to the clutch of the drive shaft and the clutch of the non-drive shaft may be regulated by the clutch actuator of the drive shaft and the clutch actuator of the non-drive shaft, respectively; and the clutch actuator of the drive shaft and the clutch actuator of the non-drive shaft may be controlled by the controller.

According to the present disclosure, a touch point of a clutch of a non-drive shaft may be learned in a state in which an existing method for learning a touch point using a non-drive shaft cannot be performed because the rotational behavior of the non-drive input shaft is synchronized with that of a drive input shaft due to the drag characteristics of a transmission while a vehicle is driven, whereby stable shifting may be provided and the reliability of a clutch characteristic curve and the quality of the vehicle may be improved.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF THE DISCLOSURE

Hereinbelow, a preferred embodiment of the present disclosure will be described in detail with reference to the accompanying drawings.

A method for learning a touch point of a clutch in a DCT vehicle may include a synchronization determination step, a drive shaft slip inducement step, a non-drive shaft torque application step, and a touch point learning step.

Figure 1:
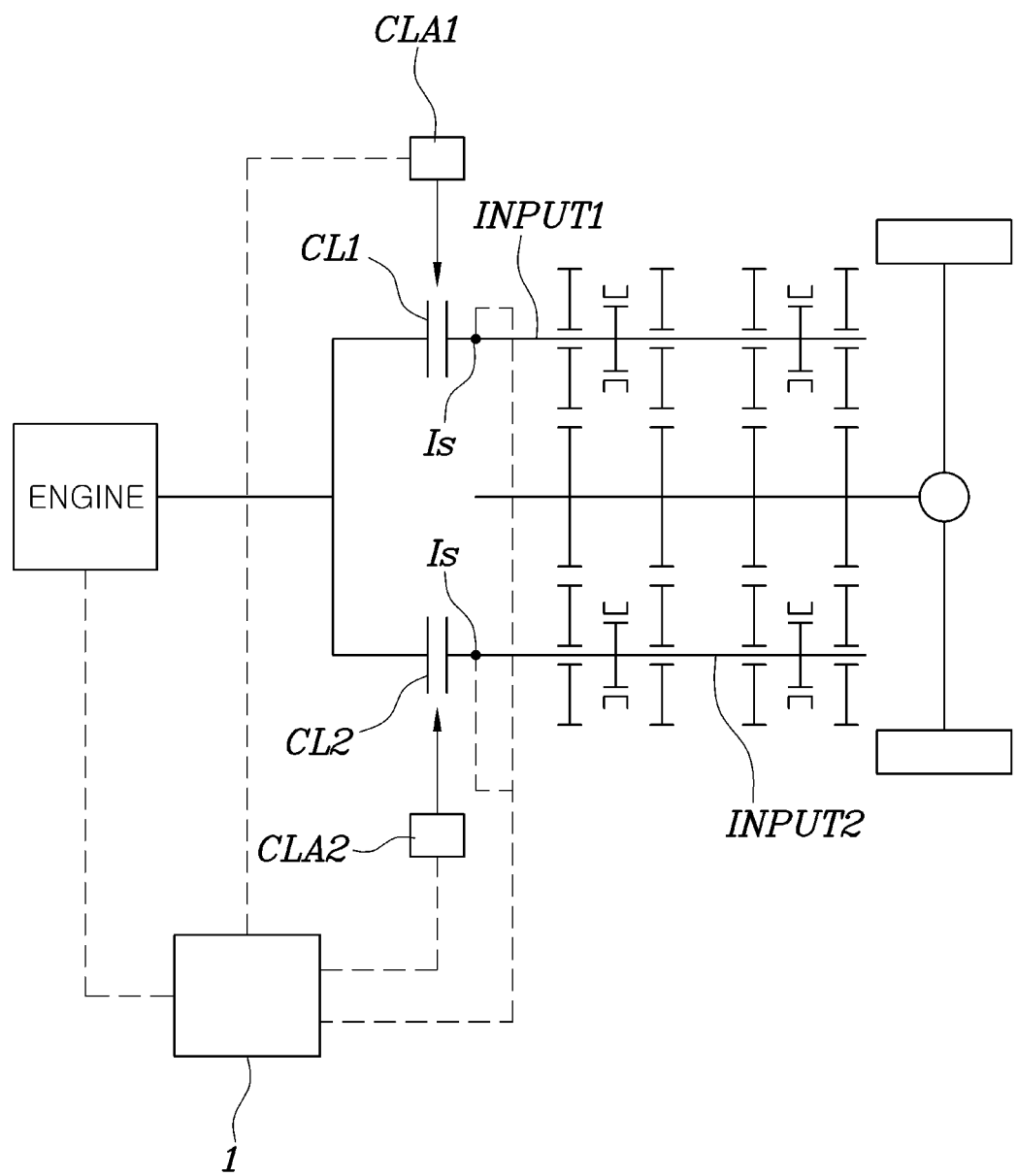
FIG. 1 is a view illustrating an entire structure of a vehicle in which a Dual Clutch Transmission (DCT) is mounted.

Specifically describing the present disclosure with reference to FIG. 1, in the synchronization determination step, a controller 1 may determine whether the difference between the speed of a drive input shaft and the speed of a non-drive input shaft is less than a reference value, or reference speed, under the condition in which a gear is engaged with the drive input shaft INPUT1 and the clutch CL1 of the drive shaft is engaged to transmit engine torque through the clutch CL1.

In other words, it is determined in this step whether a vehicle is in a driving state in which the speed of the non-drive input shaft INPUT2 does not decrease during freewheeling but is maintained to be almost the same as the speed of the drive input shaft due to the drag characteristics of a transmission. Here, the reference value may be a value for determining whether the drive input shaft INPUT1 and the non-drive input shaft INPUT2 are close to a state in which they are synchronized with each other. For example, the reference value may be set to about 20 RPM.

In this case, the clutch CL2 of the non-drive shaft may be in neutral.

Also, the speed of drive input shaft and the speed of non-drive input shaft may be measured using input shaft speed sensors Is, respectively arranged on the drive input shaft INPUT1 and the non-drive input shaft INPUT2. Clutch torque applied to the clutch CL1 of the drive shaft and the clutch CL2 of the non-drive shaft may be regulated by the clutch actuator CLA1 of the drive shaft and the clutch actuator CLA2 of the non-drive shaft, respectively.

Also, the clutch actuator CLA1 of the drive shaft and the clutch actuator CLA2 of the non-drive shaft may be controlled by the controller 1.

In the present disclosure, the clutch of the drive shaft and the clutch of the non-drive shaft are respectively expressed as reference numerals CL1 and CL2, and the clutch actuator of the drive shaft and the clutch actuator of the non-drive shaft, which regulate clutch torque applied to the clutch of the drive shaft and the clutch of the non-drive shaft, are respectively expressed as reference numerals CLA1 and CLA2. Also, the drive input shaft and the non-drive input shaft are expressed as reference numerals INPUT1 and INPUT2. However, this is an example for convenience of understanding the present disclosure, and the drive shaft and the non-drive shaft may be switched therebetween depending on the clutch engaged for a current gear or the clutch disengaged for a target gear.

Also, in the drive shaft slip inducement step, the controller 1 may induce the clutch CL1 of the drive shaft to slip by partially releasing the torque of the clutch CL1 of the drive shaft when it is determined in the synchronization determination step that the difference between the speed of the drive input shaft and the speed of the non-drive input shaft is less than the reference value, or reference speed.

Also, in the non-drive shaft torque application step, the controller 1 applies torque to the clutch CL2 of the non-drive shaft so that the speed of the non-drive input shaft follows engine speed.

Finally, in the touch point learning step, the controller 1 searches for a certain point at which the speed of the non-drive input shaft changes and differs from the speed of the drive input shaft while the speed of the non-drive input shaft follows the engine speed, and may learn the point as the touch point of the clutch CL2 of the non-drive shaft.

In other words, when it is determined to be a driving state in which the non-drive input shaft INPUT2 rotates to be synchronized with the speed of the drive input shaft due to the drag characteristics of a transmission, the clutch actuator CLA1 of the drive shaft is controlled to make the slip amount of the clutch CL1 of the drive shaft about 20 RPM, and the clutch CL2 of the non-drive shaft is also controlled to make the slip amount thereof the same as the slip amount of the clutch CL1 of the drive shaft.

Accordingly, both the clutch CL1 of the drive shaft and the clutch CL2 of the non-drive shaft slip at about 20 RPM. In this case, if torque is applied to the clutch CL2 of the non-drive shaft, the clutch CL1 of the drive shaft maintains the slip control state, which has been induced by the drive shaft slip inducement step, whereas the speed of the clutch CL2 of the non-drive shaft increases to synchronize with the engine speed.

Therefore, while the speed of the non-drive input shaft differs from the speed of the drive input shaft and increases to follow the engine speed, a certain point is determined and learned as the touch point of the clutch CL2 of the non-drive shaft.

According to the above-mentioned configuration, the present disclosure may learn the touch point of the clutch CL2 of the non-drive shaft in a driving state in which the existing method for learning a touch point cannot be performed because the rotational behavior of the non-drive input shaft INPUT2 is synchronized with the rotational behavior of the drive input shaft INPUT1 due to the drag characteristics of a transmission.

Additionally, in the touch point learning step, a slip rate is calculated through the ratio of the difference between the speed of the non-drive input shaft and the speed of the drive input shaft to the difference between engine speed and the speed of the drive input shaft as shown in the following equation, and when the slip rate exceeds a predetermined value, the point may be learned as the touch point of the clutch CL2 of the non-drive shaft.

For example, when the slip rate exceeds 30%, the point may be learned as the touch point of the clutch CL2 of the non-drive shaft.

$$\text{slip rate } (\%) = \frac{Ni2 - Ni1}{N_e - Ni1}$$

where $N_e$ denotes the engine speed, Ni1 denotes the speed of a drive input shaft, and Ni2 denotes the speed of a non-drive input shaft.

Also, in the touch point learning step, when the slip rate exceeds the predetermined value, the stroke position of the clutch actuator CLA2 of the non-drive shaft may be checked and learned as the touch point of the clutch CL2 of the non-drive shaft.

Figure 3:
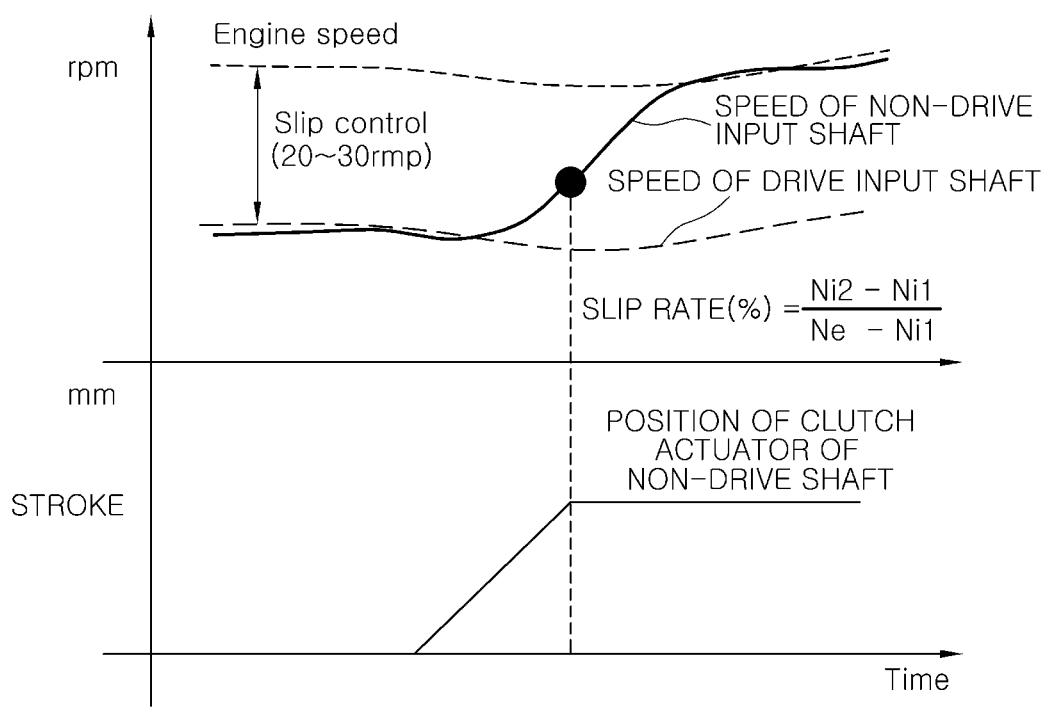
FIG. 3 is a view illustrating a Torque-Stroke (T-S) curve applied to the present disclosure.

For example, as shown in FIG. 3, the stroke position of the clutch actuator CLA2 of the non-drive shaft is checked for the point at which the slip rate exceeds 30%, and the stroke position may be learned as the touch point of the clutch.

Also, after the touch point learning step, the learned touch point of the clutch CL2 of the non-drive shaft is used to update the characteristic curve of the clutch of the non-drive shaft, whereby shift quality may be improved when next shifting is performed.

Here, the clutch characteristic curve may be a T-S curve, which represents the relationship between the stroke of a clutch actuator and clutch torque.

Figure 2:
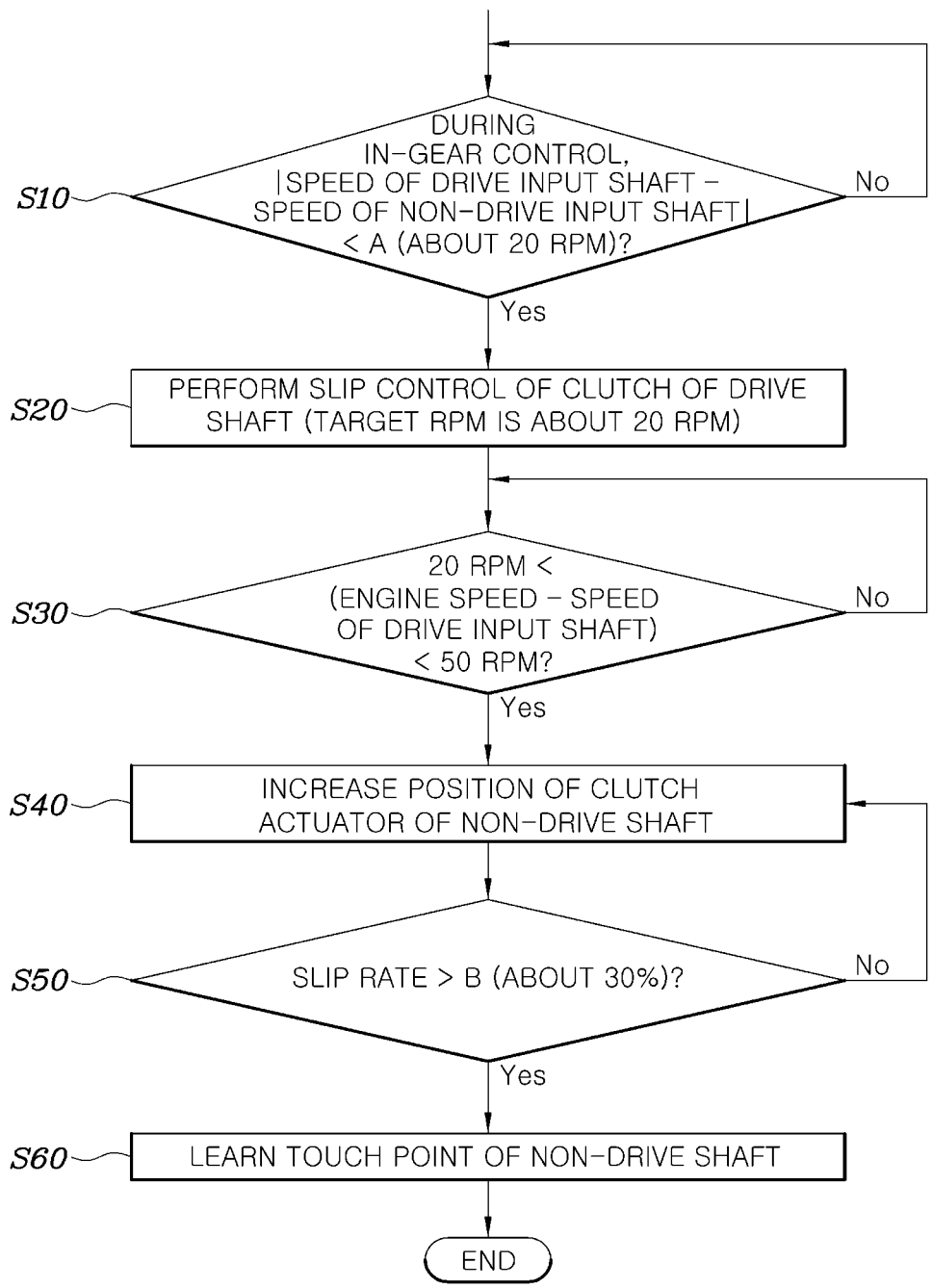
FIG. 2 is a flowchart illustrating a flow of a method for learning a touch point according to the present disclosure.

The flow of a method for learning a touch point of a clutch according to the present disclosure is described with reference to FIG. 2.

First, it is determined at step S10 whether the absolute value of the difference between the speed of the drive input shaft and the speed of the non-drive input shaft is less than value A in the situation in which a shift gear is engaged with the drive input shaft INPUT1 and a gear of the non-drive input shaft INPUT2 is disengaged.

When it is determined that the difference is less than the value A, the clutch CL1 of the drive shaft is controlled to slip to make the slip amount thereof 20 RPM at step S20.

Subsequently, it is determined at step S30 whether the slip amount of the clutch CL1 of the drive shaft is maintained at 20 to 50 RPM. When the slip amount of the clutch CL1 of the drive shaft is maintained at 20 to 50 RPM, the speed of the non-drive input shaft is controlled to increase to follow the engine speed by increasing the stroke of the clutch actuator CLA2 of the non-drive shaft at step S40.

As clutch torque is applied by the clutch actuator CLA2 of the non-drive shaft at step S40, whether the slip rate exceeds 30% is determined at step S50.

The point at which the slip rate exceeds 30% is learned as the touch point of the clutch CL2 of the non-drive shaft at step S60, and the learned touch point of the clutch CL2 of the non-drive shaft is used to update the characteristic curve of the clutch CL2 of the non-drive shaft.

As described above, the present disclosure may learn a touch point of a clutch of a non-drive shaft in a driving state in which an existing method for learning a touch point using a non-drive shaft cannot be performed because the rotational behavior of the non-drive input shaft INPUT2 is synchronized with that of a drive input shaft INPUT1 due to the drag characteristics of a transmission, whereby stable shifting may be provided and the reliability of a clutch characteristic curve and the quality of the vehicle may be improved.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. A method for learning a touch point of a clutch in a Dual Clutch Transmission (DCT) vehicle, comprising:
   a synchronization determination step in which a controller determines whether a difference between speed of a drive input shaft and speed of a non-drive input shaft is less than a reference value when a gear is engaged with the drive input shaft;
   a drive shaft slip inducement step in which the controller induces a clutch of the drive shaft to slip by partially releasing torque of the clutch of the drive shaft when it is determined in the synchronization determination step that the difference between the speed of the drive input shaft and the speed of the non-drive input shaft is less than the reference value;
   a non-drive shaft torque application step in which the controller applies torque to a clutch of the non-drive shaft so as to make the speed of the non-drive input shaft follow engine speed; and
   a touch point learning step in which, while the speed of the non-drive input shaft follows the engine speed in the non-drive shaft torque application step, the controller searches for a certain point at which the speed of the non-drive input shaft changes and differs from the speed of the drive input shaft, and learns the point as the touch point of the clutch of the non-drive shaft.

2. The method of claim 1, wherein in the touch point learning step, a slip rate is calculated as a ratio of the difference between the speed of the non-drive input shaft and the speed of the drive input shaft to the difference between the engine speed and the speed of the drive input shaft; and
   the touch point of the clutch of the non-drive shaft is learned when the slip rate exceeds a predetermined value.

3. The method of claim 2, wherein in the touch point learning step, when the slip rate exceeds the predetermined value, a stroke position of a clutch actuator of the non-drive shaft is checked and learned as the touch point of the clutch of the non-drive shaft.

4. The method of claim 1, wherein, after the touch point learning step, the learned touch point of the clutch of the non-drive shaft is used to update a characteristic curve of the clutch of the non-drive shaft.

5. The method of claim 1, wherein the speed of the drive input shaft and the speed of the non-drive input shaft are measured by input shaft speed sensors arranged on the drive input shaft and the non-drive input shaft, respectively;
   clutch torque applied to the clutch of the drive shaft and the clutch of the non-drive shaft is regulated by the clutch actuator of the drive shaft and the clutch actuator of the non-drive shaft, respectively; and
   the clutch actuator of the drive shaft and the clutch actuator of the non-drive shaft are controlled by the controller.

* * * * *